(No Model.)  2 Sheets—Sheet 1.
J. V. HAWKINS.
STOCK TRAP.
No. 436,757.  Patented Sept. 16, 1890.
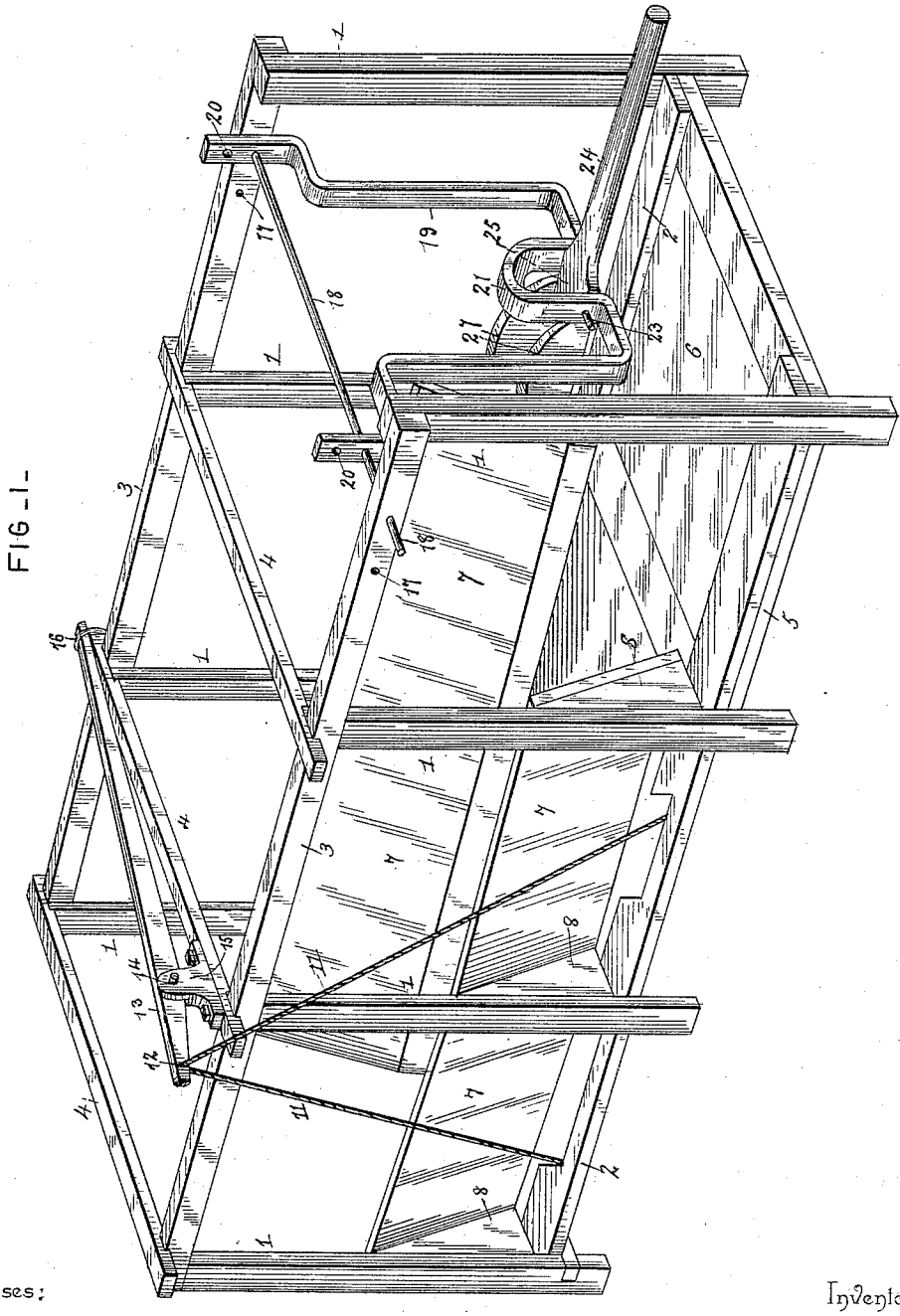
FIG-1-
Witnesses:
Jas. K. McCathran
W. S. Duvall
Inventor
John V. Hawkins
By his Attorneys,
C. A. Snow & Co.

(No Model.) 2 Sheets—Sheet 2.
J. V. HAWKINS.
STOCK TRAP.
No. 436,757. Patented Sept. 16, 1890.
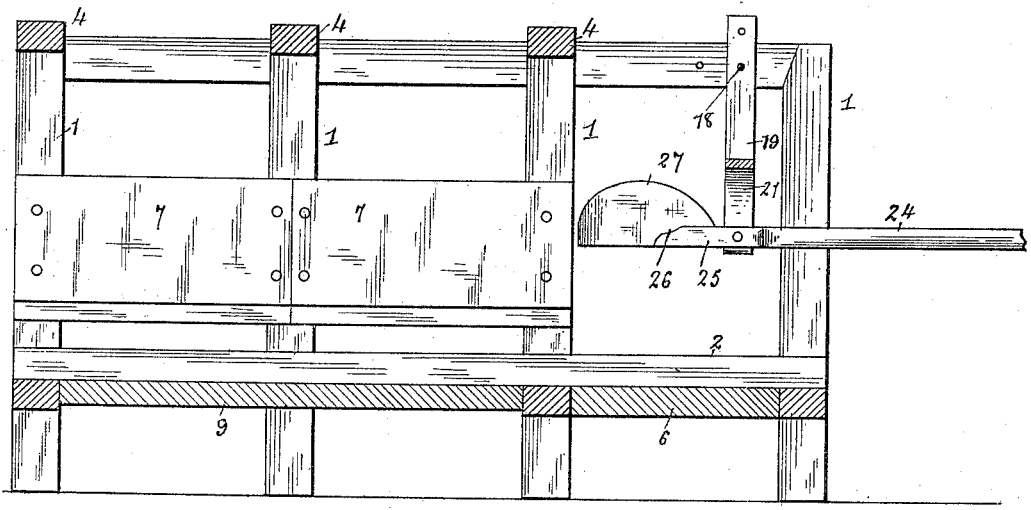
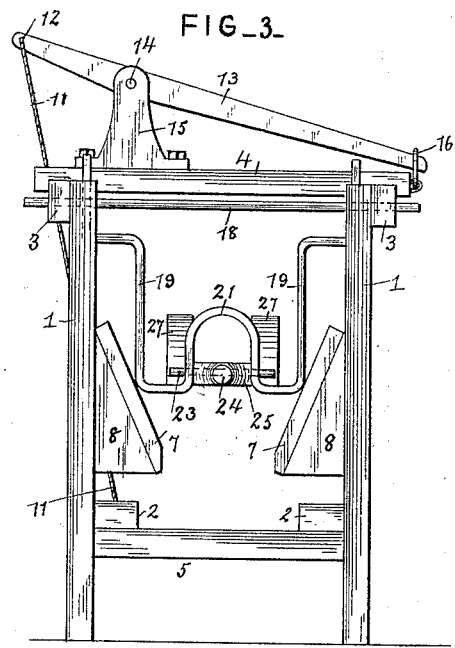 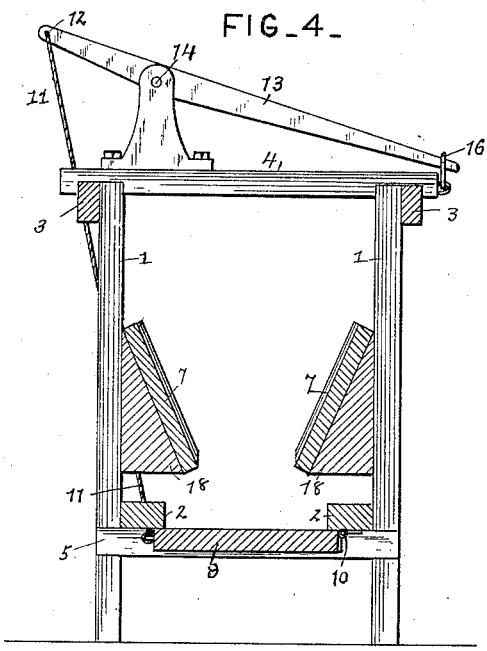
Witnesses:
Jas. K. McCathren
W. S. Duvall
Inventor
John V. Hawkins
By his Attorneys,
C. A. Snow & Co.

UNITED STATES PATENT OFFICE.

JOHN V. HAWKINS, OF ARCHIE, MISSOURI.

STOCK-TRAP.

SPECIFICATION forming part of Letters Patent No. 436,757, dated September 16, 1890.

Application filed April 8, 1890. Serial No. 347,133. (No model.)

*To all whom it may concern:*

Be it known that I, JOHN V. HAWKINS, a citizen of the United States, residing at Archie, in the county of Cass and State of Missouri, have invented a new and useful Stock-Trap, of which the following is a specification.

This invention has relation to stock-traps of that class adapted to receive and hold animals during the process of dehorning, branding, ringing, &c., and among the objects in view are to produce a strong durable trap devoid of complicated mechanism—such as windlasses, slings, &c.—for throwing and holding the animal, and one capable of receiving, instantly throwing the animal by mechanical means, holding the animal's head, and subsequently releasing its head and placing it upon its feet.

Other objects and advantages of the invention, together with the novel features thereof, will hereinafter appear, and be particularly pointed out in the claims.

Referring to the drawings, Figure 1 is a perspective of a stock-trap constructed in accordance with my invention. Fig. 2 is a longitudinal vertical section. Fig. 3 is an end elevation. Fig. 4 is a transverse section.

Like numerals of reference indicate like parts in all the figures of the drawings.

The sides of the trap are composed of a series of, in this instance, four opposite vertical standards 1, connected near their lower ends by means of opposite side sills 2 and at their upper ends by opposite side beams 3, the beams and sills extending throughout the longitudinal length of the trap. The upper ends of the standards 1 are connected by transverse bars 4, and the sills 2, opposite the two front stanchions and the rear standards, are supported by lower transverse connecting-bars 5, the two front connecting-bars supporting a platform 6, and the three connecting-bars combining to support the side sills 2, to which and the standards the bars 5 are securely bolted, as shown. The inner faces of the three rear pairs of standards have connected thereto opposite inclined side pieces 7, the inclination being obtained by means of triangular blocks 8 interposed between the inner faces of the stanchions and the outer faces of the side pieces. From front to rear the side pieces are slightly concaved, as shown, whereby they are adapted somewhat to conform to the curvature of the body of the stock.

9 represents the bottom of the trap, and the same extends from the rear cross-bar 5 to the second cross-bar, as shown, and is of a width to extend from one sill to the other. One edge of the floor is hinged, as at 10, to one of the sills, and the opposite edge has connected thereto the lower ends of two upwardly-disposed suspension-cables 11, the upper ends of which are connected, as at 12, to the free end of a lever 13, which is pivoted, as at 14, in the upper end of a bifurcated bearing-standard 15, mounted on the central upper connecting-bar 4. The free end of the lever extends to the opposite side of the trap, and is removably locked in a lowered position by a hook 16, pivoted to the end of the central upper cross-bar 5.

The upper side bars 3 in front of the forward cross-bar 4 are provided with transversely-opposite perforations 17, in any pair of which is adapted to be inserted a transverse removable rod 18.

19 represents a compound U-shaped suspension-bail, the terminals of which are provided with a series of opposite perforations 20, adapted to receive the rod 18, by which said bail is suspended within the trap.

The central portion of the bail is bent upwardly in an inverted-U form, as at 21, and passing transversely through said inverted-U portion is a bearing-pin 23, upon which is mounted pivotally a lever 24. The lever 24 is spread or widened toward its lower end, as at 25, and the lower rear face of the same is hollowed, as at 26, and at opposite sides thereof provided with embracing-flaps 27. Beyond its pivot the lever is extended to form an operating-handle, as shown.

The operation of entrapping and operating upon an animal is as follows: The lever 13 is depressed at its longest end, so that the floor is elevated and the animal led upon the same, and when wholly upon the floor the locking-hook is disengaged from the lever and the floor swings downwardly, thus removing its support from under the feet of the animal.

This lowers the animal between the inclined concave side pieces 7, the feet of the animal not having anything to rest upon. The rear end of the lever 24 is now elevated, so as to raise the head of the animal and hold the same rigidly while the operation of dehorning, branding, or ringing is carried on. The side flaps of the lever take at each side of and embrace the animal's head, while the curved portion occurring at the end of the lever takes under his throat. When in this position, it will be apparent that the animal is utterly powerless to move, and any operation may be performed with perfect ease. The position of the animal is at the same time perfectly easy, and any kicking or struggling it may indulge in can in no way injure it, and will not succeed in either disengaging it from the trap or in so moving itself as to render the operations which it is undergoing difficult to perform. After the operation has been completed the lever 13 is depressed at its longest end, and in such depression its shortest end is elevated, raising the floor and placing the same under the feet of the animal, after which the lever is locked in a raised position and the compound U-shaped bail swung above the trap, so as to provide an unobstructed passage through which the animal may pass from the front of the frame, its exit to be followed by the entrance of the next or succeeding animal.

Having thus described my invention, what I claim is—

1. In a stock-trap, the combination, with the frame having opposite side bars and means for retaining an animal between the same, of a transverse rod connecting the side bars, a U-shaped bail pivoted upon the rod, and a lever pivoted upon the bail and adapted at its lower end to receive the head of an animal, substantially as specified.

2. In a stock-trap, the combination, with the frame and the opposite side bars provided with a series of perforations and means for retaining an animal between the side bars, of a transverse removable bar mounted in the perforations and a depending U-shaped pivoted bail having a series of perforations formed in its terminals and its lower portion bent into inverted-U form, and a lever pivoted in the inverted-U-shaped portion and at one side of the pivot terminating in a handle and at its opposite side having a concave portion and opposite side flaps, substantially as specified.

In testimony that I claim the foregoing as my own I have hereto affixed my signature in presence of two witnesses.

JOHN V. HAWKINS.

Witnesses:
C. F. MITCHELL,
H. THOMAS.